United States Patent [19]

Schad et al.

[11] Patent Number: 5,507,637
[45] Date of Patent: Apr. 16, 1996

[54] HOT RUNNER SLIDING NOZZLE

[75] Inventors: Robert D. Schad, Toronto; Edward J. Jenko, Bolton, both of Canada

[73] Assignee: Husky Injection Molding Systems Ltd., Bolton, Canada

[21] Appl. No.: 397,851

[22] Filed: Mar. 2, 1995

[51] Int. Cl.⁶ .................................................. B29C 45/20
[52] U.S. Cl. ........................ 425/549; 264/328.15
[58] Field of Search ........................ 425/549; 264/328.15

[56] References Cited

U.S. PATENT DOCUMENTS 4,588,367  5/1986  Schad .
4,793,795  12/1988  Schmidt et al. .
4,832,593  5/1989  Brown .
4,981,431  1/1991  Schmidt .

Primary Examiner—Tim Heitbrink
Attorney, Agent, or Firm—Bachman & LaPointe

[57] ABSTRACT

The present invention relates to an improved nozzle-manifold assembly having utility in injection molding machines for making molded plastic articles. The nozzle assembly employs a clamp ring to apply a clamping force to the nozzle housing to cause it to mate with a manifold so as to prevent leakage of molten plastic material between the nozzle housing and the manifold. The clamp ring is mounted to the manifold by a plurality of screws whose tightening creates the desired clamping force and an effective seal between the nozzle housing and the manifold. The nozzle-manifold assembly also includes a centering ring for positioning the nozzle housing within a bore in a mold plate.

23 Claims, 2 Drawing Sheets

HOT RUNNER SLIDING NOZZLE

BACKGROUND OF THE INVENTION

The present invention relates to an improved manifold-nozzle assembly for use in an injection molding machine for manufacturing molded plastic articles, which assembly includes a clamp ring arrangement for clamping a nozzle housing against a manifold while permitting the nozzle housing to slide against the manifold as a result of thermal expansion.

There are numerous designs for injection molding nozzle assemblies which utilize the concept of the nozzle back face being free to slide against the front surface of a hot runner manifold in communication with the nozzle housing. In these designs, it is necessary to apply a high force to keep the nozzle and manifold tightly together and to preclude plastic leakage between the two as a result of the plastic injection pressure during the molding process.

U.S. Pat. No. 4,588,367 to Schad illustrates a system wherein a spring arrangement for pushing the nozzle against the manifold is used to provide plastic sealing pressure. This arrangement works well for smaller nozzles having relatively small melt channels which do not create large separating forces between the nozzle and the manifold. However, as larger nozzles are required for the molding of larger plastic parts, the separation forces become much greater due to the increased projected area of the larger melt channel subjected to the pressure of the plastic melt. A satisfactory spring design for large nozzle systems would be prohibitively large and cumbersome. Still further, in a spring system, the mold plates must be precision machined to ensure that the spring pressures are sufficient and consistent. This is a problem in the manufacturing process because metal cutting machines used to fabricate large mold parts are conventionally not as accurate or precise as smaller machines and hence desired dimensional tolerances are exceedingly difficult and time consuming to satisfy. If tolerances are not met, the result can be insufficient clamping force on the nozzle to prevent plastic leakage or possible overclamping forces which can damage the hot runner components and also cause leakage.

U.S. Pat. No. 4,981,431 to Schmidt illustrates a nozzle which is directly screwed onto a manifold. Threads are provided in the back face of the nozzle and screws passing through the manifold hold the nozzle tightly to it, providing a preload to aid against plastic leakage at the melt channel interface. This design incorporates a nozzle flange and opposing pressure pad which act to squeeze the manifold and nozzle housing together during thermal expansion. As shown in this patent, the nozzle is centered and axially located in the mold plate while the manifold is allowed to expand as it heats up to operating temperature. The expansion of the manifold causes sliding between the manifold front face and the nozzle back face. The disadvantage of this approach is that the fastening screw head will travel with the manifold expansion while the screw thread will remain fixed in the nozzle which is restricted from lateral movement. The result is that the screw can be excessively bent and stretched causing immediate failure or loss of sufficient properties to maintain the interfacial plastic seal under injection pressure. This is especially true if the manifold is long or large in size and dictates a greater thermal expansion distance to travel, causing much greater stresses to be imposed upon the nozzle screws.

U.S. Pat. No. 4,832,593 to Brown shows a method to isolate the screws from travelling while still providing a clamping or sealing force between the nozzle and manifold. A manifold cap provides a resting surface for the screw heads and is keyed to a nozzle extension so that neither the screw head nor the screw thread is required to move laterally during thermal expansion of the manifold. This design can be overly bulky as it must reach out over and around the hot runner manifold to grip it like a vise. Also, freedom of manifold design is not permitted in the area directly over the nozzle as it must be sized and shaped to receive the nozzle extension and the manifold cap.

U.S. Pat. No. 4,793,795 to Schmidt et al. shows a method of locating a nozzle spigot in the side of a manifold and holding it against the manifold using arcuately shaped members fastened with screws through the manifold. This design has a number of shortcomings. First, as the manifold expands, it carries the nozzle spigot and hence the rear of the nozzle with it. This results in the nozzle tipping axially as the rear of the nozzle moves with the manifold while the front of the nozzle stays located at its front by the tip insert in the mold plate. Excessive wear and pressure are put on the tip as it must resist the forces acting on the rear portion of the nozzle. Also, as the manifold expands in all directions from the locating dowel, the nozzle will actually be lifted as well as pushed laterally. Because the nozzle front portion forms part of the molding surface, it will be necessary to perform complex calculations to determine how much movement will be observed at the nozzle tip. The tip design will need to compensate for all movements caused axially and laterally, due to thermal expansion of the manifold. Additionally, the nozzle is more difficult to manufacture with a side mounting spigot feature and the manifold is also more expensive to make, needing a mating counterbore to receive the nozzle spigot.

There remains a need for an effective nozzle-manifold assembly which compensates for thermal expansion while providing an effective seal between the nozzle housing and the manifold.

SUMMARY OF THE INVENTION

Accordingly, it is an object of the present invention to provide a nozzle-manifold assembly which provides a pre-determined and consistent sealing force between the nozzle housing and the manifold.

It is a further object of the present invention to provide an assembly as above which is more flexible and adaptable to manufacturing variances.

It is still a further object of the present invention to provide an assembly as above which provides a more compact nozzle design.

The foregoing objects are attained by the nozzle-manifold assembly of the present invention.

In accordance with the present invention, the assembly comprises a nozzle housing positioned within a bore in a first mold plate. The nozzle housing has a first flow channel through which a liquified material such as molten plastic flows. The first flow channel has a nozzle at a first end and communicates with a source of the liquified material by a second flow channel in a manifold. The nozzle housing has a substantially flat end surface abutting a substantially flat surface of the manifold. The end surface of the nozzle housing is able to slide along the substantially flat surface of the manifold as a result of thermal expansion. The assembly further comprises means for centering the nozzle housing within the bore in the first mold plate and means for clamping the nozzle housing against the manifold to prevent leakage of the liquified material as said material flows from the second flow channel to the first flow channel. The clamping means comprises a clamping ring surrounding a portion of the nozzle housing and means for joining the clamping ring to the manifold and thereby creating a clamping force which maintains a seal between the nozzle housing and the manifold.

Other details of the assembly of the present invention are set forth hereinafter. Still other objects and advantages of the assembly of the present invention will become more apparent from the following description and drawings wherein like reference numerals depict like elements.

DETAILED DESCRIPTION OF THE PREFERRED EMBODIMENT(S)

Figure 1:
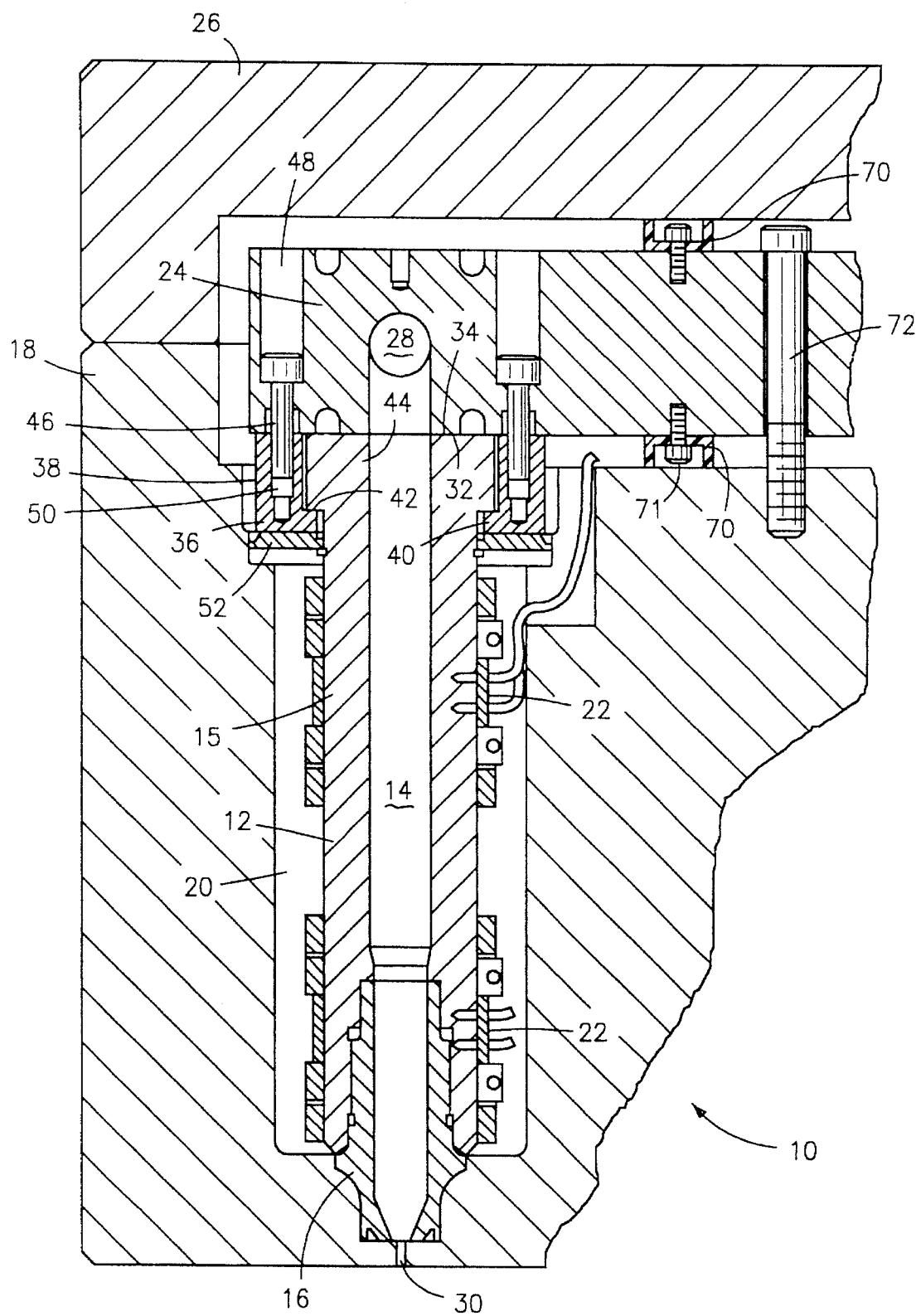
FIG. 1 is a sectional view of the nozzle-manifold assembly of the present invention.

Referring now to the drawings, FIG. 1 shows a nozzle-manifold assembly 10 which has utility in an injection molding machine for manufacturing molded plastic articles. The assembly 10 includes a nozzle housing 12 having a flow channel 14 extending therethrough. The flow channel communicates with a nozzle tip 16 seated within an end portion of the nozzle housing. The design of the nozzle tip and the manner in which the nozzle tip is seated within the nozzle housing are not pertinent to the instant invention. The nozzle tip may have any suitable design known in the art and may be seated in the nozzle housing in any desired manner. The nozzle housing 12 is positioned within a well or bore 20 in a first mold plate 18. The manner in which the nozzle housing is positioned within the bore 20 will be discussed hereinafter.

The nozzle housing 12 is preferably surrounded by heater elements 22. The heater elements 22 serve to maintain the liquified material flowing through the channel 14 in a liquified or molten state. The heater elements 22 may comprise any suitable heaters or heater arrangement known in the art.

The assembly 12 further comprises a manifold 24, preferably located between the first mold plate 18 and a second mold plate 26. The manifold 24 has a flow channel 28 which communicates with a source (not shown) of the liquified material. As shown in FIG. 1, one end of the channel 28 is aligned with and communicates with an end of the channel 14 so as to facilitate flow of the liquified material from the source to the nozzle tip for injection through a gate 30 into a mold space (not shown).

As shown in FIG. 1, the nozzle housing 12 has a substantially flat rear face 32 abutting a substantially flat front face 34 of the manifold 24. The nozzle housing 12 is pressed up against the manifold 24 by an annular clamp ring 36 which completely surrounds an enlarged upper portion 44 of the nozzle housing 12. The ring 36 has a side wall portion 38 with an annular lip 40. The lip 40 abuts and engages an annular surface 42 formed by the enlarged, upper portion 44 of the nozzle housing 12.

A desired clamping force is generated between the nozzle housing 12 and the manifold 24 by screws 46 which are inserted through bores 48 in the manifold and threaded into threaded bores 50 within the side wall portion 38 of the clamp ring 36. The number and position of the screws can be adapted to suit the individual application. Depending on the size of the flow channels and the injection pressure, more screws or larger screws may be employed to obtain a desired clamping force and thereby maintain an effective seal between the nozzle housing 12 and the manifold 24.

The nozzle-manifold assembly further includes a nozzle centering ring 52 positioned adjacent the clamp ring 36. As shown in FIG. 1, the ring 52 is preferably located within an upper portion of the bore 20. To properly position the nozzle housing 12, the centering ring 52 has an inner diameter substantially equal to the outer diameter of the main body 15 of the nozzle housing and an outer diameter substantially equal to the diameter of the upper portion of the bore 20 in which the ring 52 resides.

Since the nozzle housing 12 does not have any means to longitudinally fix its position in the mold plate 18, manifold insulators 70 are employed on opposing faces of the manifold 24 to insure that the housing 12 is appropriately positioned within the mold plate 18. The manifold insulators 70 are positioned between the surfaces of the manifold 24 and adjacent surfaces of mold plates 18 and 26. The insulators 70 may be formed from any suitable insulating material known in the art and may be joined to the manifold in any desired manner such as by screws 71. If the mold plates 18 and 26 are not accurately machined to size at the location in which the manifold insulators 70 rest, the insulators may be independently and quickly resized to an appropriate length that will position the manifold 24 and housing 12 correctly.

Alternatively, manifold insulators 70 may be provided only on the manifold surface facing mold plate 18. In this case, screws 72 will maintain the position of manifold front surface 32 and thereby fix the longitudinal position of nozzle housing 12 in the mold plate 18.

When using the clamping ring arrangement of the present invention, it is important not to have such a great screw clamping force which precludes or impedes sliding movement between the surfaces 32 and 34. In such an event, surface galling between the nozzle housing and the manifold may result or the nozzle centering ring may be damaged from excessive lateral forces.

To assist in reducing any sliding friction (while maintaining high clamp forces) between the nozzle housing and the manifold, metal treatments or coatings may be used. Local or surface hardening of the sliding surfaces 32 and 34 can reduce metal galling. Alternatively, a surface treatment by implantation or coating of slip inducing elements such as molybdenum disulfide may be used.

Figure 2:
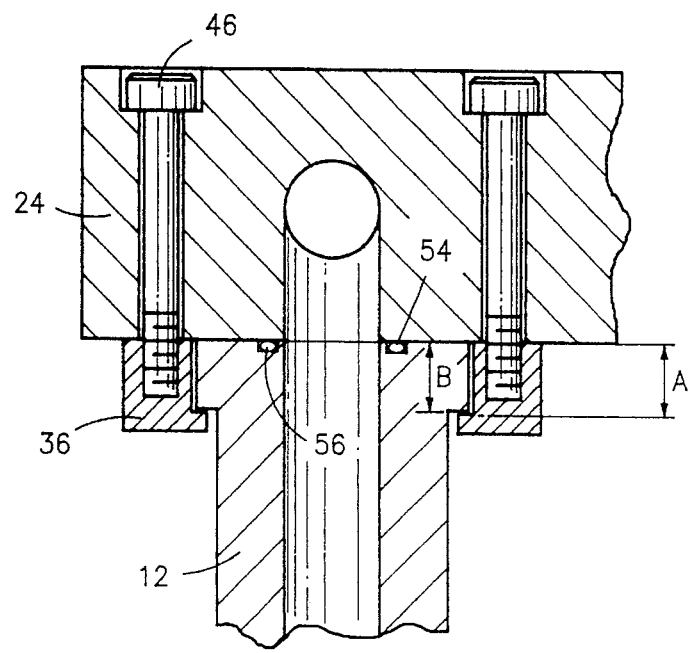
FIG. 2 is a sectional view of an alternative arrangement for the nozzle-manifold interface in the assembly of FIG. 1.

FIG. 2 shows an alternative embodiment of the assembly of FIG. 1 wherein an additional sealing ring 54 is used to establish a desired sealing force and prevent leakage of the liquified material or molten plastic flowing between the manifold and the nozzle housing. The ring 54 may be a metal O-ring which is positioned within a groove 56 in the surface 32 of the nozzle housing. When a clamping force is applied to the nozzle housing by the clamp ring 36 and the screws 46, the O-ring 54 is compressed and serves to substantially prevent liquified material such as molten plastic from leaking past it. If desired, the ring 54 could be made from a material having a higher rate of thermal expansion than the material forming the nozzle housing 12 and thereby, as the assembly heats up, provide an increased sealing force against leakage of the liquified material.

If desired, the clamp ring 36 could be designed with a sidewall dimension A which is only slightly less than the extent B of the upper portion of the nozzle housing 12 so that the clamp ring 36 is only nominally deformed by the screws 46 when they are tightened. In this embodiment, the screws 46 will draw the ring 36 against the manifold surface 34 where the ring will be prevented from further bending or flexing. This will serve to provide a predetermined, maximum clamp force between the nozzle housing and the manifold interface, regardless of any over tightening of the screws, and also prevent the clamp ring from being overly deformed to the point of damage, should the screws be tightened too much.

In a design where the dimension A is much shorter than the dimension B, uneven screw tightening (and hence excessive clamp ring deformation and uneven clamping) may be of concern. In these cases, a specified torque sequence would best be employed where the screws are partially tightened in a criss-cross pattern over the center of the nozzle housing to initially seat and level the clamp ring in place. Thereafter, the screws could be further tightened to their specified torque using the same pattern, resulting in even clamp ring clamping all the way around the base of the nozzle housing.

Figure 3A:
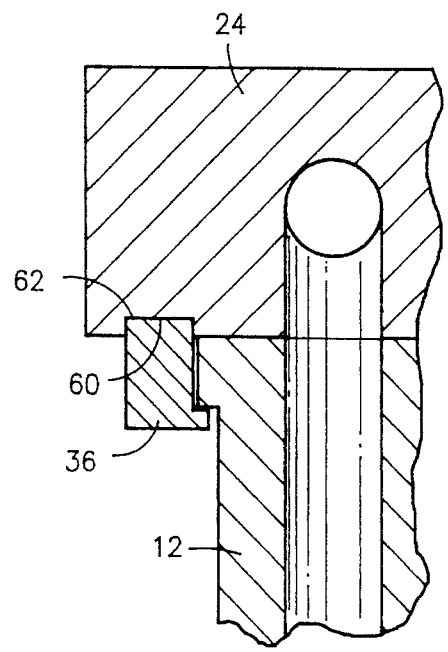
FIGS. 3A & 3B are sectional views of alternative embodiments of the nozzle-manifold assembly of the present invention illustrating techniques for locating a clamping ring in a particular location.
Figure 3B:
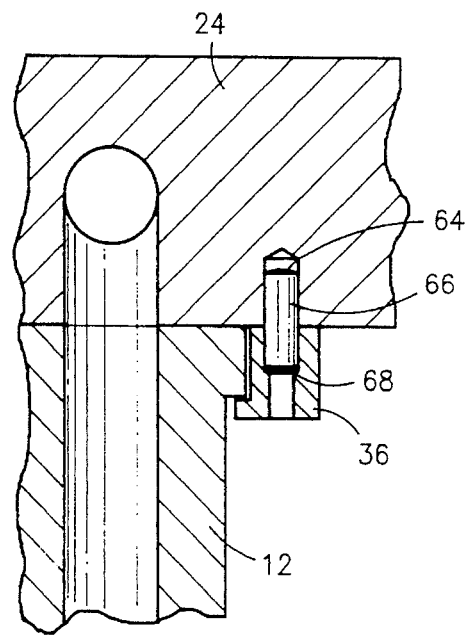

In some assemblies, it may be advantageous to control the clamp ring itself from any possibility of sliding against the manifold face and instead permit sliding at the interface between the nozzle housing and the clamp ring as the manifold expands. This will keep both screw ends moving together during thermal expansion and avoid unwanted bending or stretching of the screw. The ring 36 can be diametrically or otherwise located into the manifold 24 as shown in FIG. 3A by seating a portion 60 of the ring 36 in a groove 62 machined into the surface 34 of the manifold 24. Alternatively, a dowel arrangement such as that shown in FIG. 3B can be used. The dowel arrangement involves providing the manifold 24 with a plurality of bores 64 into which dowels 66 are inserted and providing the clamp ring 36 with a plurality of bores 68 for receiving the dowels 66. It should be noted that either of the arrangements of FIG. 3A or 3B are used in conjunction with the screws 46 for joining the clamp ring 36 to the manifold and are used to further lock the clamp ring 36 to the manifold.

An injection molding machine typically will have a plurality of nozzles receiving liquified material or molten plastic from a flow channel or flow channels within a central manifold. Therefore, in a machine using the nozzle-manifold assembly of the present invention, the nozzle housings 12 would be loosely attached to the manifold 24 using clamp rings 36. Next, the manifold 24, with the loosely attached nozzles, would be lowered into position in the mold plate 18. The nozzle front portion or tip 16 and the nozzle centering ring 52 will find their center in the mold plate wells or bores 20, as the clamp ring permits the nozzle housing to freely slide in the lateral direction. Once the manifold insulators 70 have found their resting position and the nozzles are centrally located, the screws 46 can be tightened.

During heat-up of the hot runner system associated with the manifold, the manifold 24 will expand laterally with respect to the nozzle housings 12. The nozzles will remain centered in their wells or bores 20, located in place by the nozzle centering ring 52 and the nozzle tip 16. Sliding will take place between the nozzle housing back face 32 and the manifold front face 34. Sliding will also take place between either the clamp ring 36 and manifold 24 or the clamp ring 36 and the nozzle housing 12, depending on whether features such as that shown in FIGS. 3A and 3B are employed.

As can be seen from the foregoing description, an advantageous nozzle-manifold assembly employing a clamp ring to secure the nozzle housing to the manifold has been described. The use of a separate clamp ring permits the nozzle housing to have a rear diameter only slightly larger than the main nozzle body, thereby saving metal material during manufacturing and saving time in cutting a minimal amount of material from the original bar stock to achieve the final shape of the nozzle. If a predetermined amount of clamp force is found to be desirable, the clamp ring of the present invention can be designed to butt up against the manifold once the ideal clamping force is achieved thereby limiting the force to a designed maximum amount. Still further, the assembly of the present invention eliminates the need for the mold plate to have a closely controlled bore depth. This is because it is not required to generate any sealing force. The assembly of the present invention is further advantageous in that it is easily adaptable to large mold designs and permits easy manufacturing, assembly and preparation. This is because of the simple and compact way in which this new assembly works.

While it is preferred to position the nozzle housing 12 within the bore 20 using a centering ring 52, the centering ring may be omitted if desired. Instead, the clamp ring 36 can be provided with an outer diameter substantially equal to the diameter of that portion of the well or bore 20 in which it resides so that the outer edge of the clamp ring abuts the interior wall of the bore 20.

It is apparent that there has been provided in accordance with this invention an improved hot runner sliding nozzle which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An assembly for use in an injection molding machine for manufacturing molded articles which comprises:

a nozzle housing having a first flow channel through which liquified material flows;

said nozzle housing being positioned within a bore in a first mold plate;

means for centering said nozzle housing within said bore;

said first flow channel having a nozzle at a first end and being connected to a source of liquified material by a second flow channel in a manifold;

said nozzle housing having a substantially flat end surface abutting a substantially flat surface of said manifold;

said end surface of said nozzle housing being able to slide along said substantially flat surface of said manifold as a result of thermal expansion; and means for clamping said nozzle housing against said manifold to prevent leakage of said liquified material as said material flows from said second flow channel to said first flow channel, said clamping means comprising a clamp ring surrounding a portion of said nozzle housing and means for joining said clamp ring to said manifold and thereby creating a clamping force which maintains a seal between the nozzle housing and said manifold.

2. The assembly of claim 1 wherein said joining means comprises at least two screws threadingly engaging said clamp ring.

3. The assembly of claim 2 further comprising at least two dowels seated in bores in said manifold and mating with bores within said clamp ring, said at least two dowels preventing sliding movement of said clamp ring against said manifold.

4. The assembly of claim 2 further comprising a groove within said manifold adapted to receive a mating portion of said clamp ring so as to prevent sliding movement of said clamp ring against said manifold.

5. The assembly of claim 1 wherein said centering means comprises a centering ring surrounding a main body portion of said nozzle housing, said centering ring being positioned adjacent to said clamp ring.

6. The assembly of claim 1 wherein said centering means comprises said clamp ring having an outer edge which abuts the interior wall of said bore.

7. The assembly of claim 1 further comprising:
means for heating said liquified material surrounding said nozzle housing.

8. The assembly of claim 1 further comprising:
a second mold plate; and
manifold insulators positioned between surfaces of said first and second mold plates and surfaces of said manifold so as to accommodate positioning of said nozzle housing in said bore.

9. The assembly of claim 1 further comprising:
a groove machined into said nozzle housing; and
an O-ring positioned within said groove for increasing the sealing between said nozzle housing and said manifold, said O-ring abutting a surface of said manifold and being compressed a predetermined amount by the clamping force created by said joining means to further prevent said liquified material from leaking past said O-ring.

10. The assembly of claim 9 further comprising:
said O-ring being made of a material having a higher rate of thermal expansion than the material forming said nozzle housing for providing an increased sealing force against leakage of said liquified material.

11. The assembly of claim 1 wherein said clamp ring has a sidewall dimension only slightly less than an extent of an upper portion of said nozzle housing so as to prevent substantial deformation of said clamp ring when said joining means are tightened.

12. The assembly of claim 1 further comprising:
manifold insulators positioned between a surface of said first mold plate and a surface of said manifold so as to accommodate positioning of said nozzle housing in said bore.

13. An assembly for use in an injection molding machine for manufacturing molded articles which comprises:
a nozzle housing having a first flow channel through which liquified material flows;
said nozzle housing being positioned within a bore in a first mold plate;
said first flow channel having a nozzle at a first end and being connected to a source of liquified material by a second flow channel in a manifold;
means for clamping said nozzle housing against said manifold to prevent leakage of said liquified material as said material flows from said second flow channel to said first flow channel;
said clamping means comprising a clamp ring surrounding a portion of said nozzle housing and means for joining said clamp ring to said manifold and thereby creating a clamping force which maintains a seal between the nozzle housing and said manifold; and
a centering ring surrounding a main body portion of said nozzle housing to center said nozzle housing within said bore, said centering ring being positioned adjacent to said clamp ring.

14. The assembly of claim 13 wherein said joining means comprises at least two screws threadingly engaging said clamp ring.

15. The assembly of claim 14 further comprising at least two dowels seated in bores in said manifold and mating with bores within said clamp ring, said at least two dowels preventing sliding movement of said clamp ring against said manifold.

16. The assembly of claim 14 further comprising a groove within said manifold adapted to receive a mating portion of said clamp ring so as to prevent sliding movement of said clamp ring against said manifold.

17. The assembly of claim 13 further comprising:
means for heating said liquified material surrounding said nozzle housing.

18. The assembly of claim 13 further comprising:
a second mold plate; and
manifold insulators positioned between surfaces of said first and second mold plates and surfaces of said manifold so as to accommodate positioning of said nozzle housing in said bore.

19. The assembly of claim 13 further comprising:
said nozzle housing having a substantially flat end surface abutting a substantially flat surface of said manifold, said end surface of said nozzle housing being able to slide along said substantially flat surface of said manifold as a result of thermal expansion.

20. The assembly of claim 13 further comprising:
a groove machined into said nozzle housing; and
an O-ring positioned within said groove for increasing the sealing between said nozzle housing and said manifold, said O-ring abutting a surface of said manifold and being compressed a predetermined amount by the clamping force created by said joining means to further prevent said liquified material from leaking past said O-ring.

21. The assembly of claim 20 further comprising:
said O-ring being made of a material having a higher rate of thermal expansion than the material forming said nozzle housing for providing an increased sealing force against leakage of said liquified material.

22. The assembly of claim 13 wherein said clamp ring has a sidewall dimension only slightly less than an extent of an upper portion of said nozzle housing so as to prevent substantial deformation of said clamp ring when said joining means are tightened.

23. The assembly of claim 13 further comprising:
manifold insulators positioned between a surface of said first mold plate and a surface of said manifold so as to accommodate positioning of said nozzle housing in said bore.

\* \* \* \* \*